US012589938B2

(12) United States Patent
Allard et al.

(10) Patent No.: US 12,589,938 B2
(45) Date of Patent: Mar. 31, 2026

(54) SHIPPING CONTAINER COMPRISING A LAMINATED BUILDING ELEMENT

(71) Applicant: FM GLOBAL SAFETY SOLUTIONS AB, Gothenburg (SE)

(72) Inventors: Fredrik Allard, Billdal (SE); Micael Nystrom, Linkoping (SE)

(73) Assignee: FM GLOBAL SAFETY Solutions AB, Gothenburg (SE)

( * ) Notice: Subject to any disclaimer, the term of this patent is extended or adjusted under 35 U.S.C. 154(b) by 23 days.

(21) Appl. No.: 18/694,975

(22) PCT Filed: Sep. 22, 2022

(86) PCT No.: PCT/SE2022/050836
§ 371 (c)(1),
(2) Date: Mar. 24, 2024

(87) PCT Pub. No.: WO2023/048626
PCT Pub. Date: Mar. 30, 2023

(65) Prior Publication Data
US 2024/0417164 A1      Dec. 19, 2024

(30) Foreign Application Priority Data
Sep. 24, 2021      (SE) .................................... 2151171-2

(51) Int. Cl.
*B65D 90/02*        (2019.01)
*B32B 9/00*         (2006.01)
(Continued)

(52) U.S. Cl.
CPC ............ *B65D 90/022* (2013.01); *B32B 9/005* (2013.01); *B32B 9/041* (2013.01); *B32B 15/10* (2013.01);
(Continued)

(58) Field of Classification Search
CPC .... B65D 88/121; B65D 88/12; B65D 90/023; B65D 90/022; B65D 90/02; B65D 1/40;
(Continued)

(56) References Cited

U.S. PATENT DOCUMENTS 239,140 A * 3/1881 Braman ................... B65D 9/32
217/54
1,147,227 A * 7/1915 Ford ...................... B65D 15/06
220/62.2
(Continued)

FOREIGN PATENT DOCUMENTS

CA          2617021 A1 * 7/2008 ............. E04C 2/246
DE          19603073 A1    7/1997
WO          0185443 A1    11/2001

*Primary Examiner* — Robert J Hicks
(74) *Attorney, Agent, or Firm* — NEXUS IP LAW PLLC

(57)      ABSTRACT

The invention relates to a shipping container (13) having a wall (14) comprising an external wall element (21). The wall (14) comprises a laminated building element (1). The laminated building element comprises an outer layer of wood (2), an intermediate metallic layer (3) being an aluminium or aluminium alloy sheet, and an inner layer of ceramic (4). The laminated building element (1) is arranged inside the external wall element with the outer wood layer (2) facing the external wall element (21), and the laminated building element (1) is arranged at a distance from an inside surface (23) of the external wall element such that a gap (25) between the external wall element and the laminated building element is created.

4 Claims, 5 Drawing Sheets

(51) Int. Cl.

| | |
|---|---|
| *B32B 9/04* | (2006.01) |
| *B32B 15/10* | (2006.01) |
| *B32B 15/20* | (2006.01) |
| *B65D 88/12* | (2006.01) |

(52) U.S. Cl.
CPC ............ *B32B 15/20* (2013.01); *B65D 88/121* (2013.01); *B65D 90/027* (2013.01); *B32B 2439/40* (2013.01)

(58) Field of Classification Search
CPC ......... B32B 9/005; B32B 9/041; B32B 9/042; B32B 9/04; B32B 15/10; B32B 15/20
USPC ......... 220/1.5, 62.2, 62.19, DIG. 11; 217/17, 217/43 R, 36, 12 R
See application file for complete search history.

(56) References Cited

U.S. PATENT DOCUMENTS

| | | | | |
|---|---|---|---|---|
| 3,155,266 | A | * | 11/1964 | Yamamoto .............. F17C 3/027 |
| | | | | 220/62.2 |
| 4,061,815 | A | * | 12/1977 | Poole, Jr. .............. B32B 27/065 |
| | | | | 428/425.9 |
| 4,876,124 | A | * | 10/1989 | Dallum ................ B65D 90/022 |
| | | | | 220/560.12 |
| 5,731,052 | A | * | 3/1998 | Gancedo ................... B32B 7/09 |
| | | | | 428/36.1 |
| 2004/0126602 | A1 | | 7/2004 | Wallner |
| 2006/0144837 | A1 | * | 7/2006 | Linares ................ B65D 88/528 |
| | | | | 220/1.5 |
| 2012/0298657 | A1 | | 11/2012 | Wessels et al. |
| 2021/0039351 | A1 | | 2/2021 | Fenton |
| 2021/0317254 | A1 | * | 10/2021 | White ................... B32B 29/007 |

* cited by examiner

SHIPPING CONTAINER COMPRISING A LAMINATED BUILDING ELEMENT

TECHNICAL FIELD

The invention relates to a shipping container comprising a laminated building element.

BACKGROUND

Due to the increased number of thefts, containers such as storage and shipping containers which cannot be easily broken, are required for storing and transporting goods in a safe way. Particularly, when the goods in a shipping container to be stored and transported include explosives, weapons, cash or other valuables. The shipping container has to be burglar-proof and approved according to accepted certification systems.

At the same time, the weight of the container has to be as low as possible, and the space available inside the container should be kept as large as possible within the standardized sizes of containers.

Today's strong rooms that fulfil burglar-proof requirements are made of steel and concrete and have thick walls making them heavy and unsuitable for containers to be transported by rail, truck or container ship.

SUMMARY

An objective of the invention is to provide a shipping container, by which shipping container an improved burglary protection can be achieved.

The objective is achieved by a shipping container according to claim 1.

The invention is based on the insight that by such a laminated building element, there is no hand tool available by which a wall made from such a laminated building element can be quickly forced by a burglar. At the same time, the laminated building element and a wall made therefrom have relatively low weight, which means that the weight of the container can be kept relatively low so as to fulfil the requirements on standardized containers. By arranging the laminated building element at a distance from the inside surface of the external wall element such that a gap between the external wall element and the laminated building element is created, deformation or movement of the external wall element relative to the laminated building element without affecting the laminated building element can take place. Such a gap can be in the range of 2-20 mm, preferably 4-8 mm.

By the term laminated building element or laminate is meant that the layers comprised in the building element are stacked and bonded together.

The outer wood layer cannot be quickly forced by a cutting torch or a disc grinder. The outer wood layer is preferably made from multiple veneer sheets. For example, each sheet can have a thickness in the range of 0.5-3 mm and 10-50 sheets can be used.

The outer wood layer can be plywood, such as cross grain plywood of birch. The thickness of the outer wood layer can be in the range of 10-50 mm, preferably 15-40 mm, and more preferably 20-35 mm. A plywood made of a number of birch veneer sheets in the range of 20-35, where the thickness of each sheet is approximately 1 mm, has been proven to be very hard and resistant against both cutting torch and disc grinder tools. In addition to birch, other wood species which can be used for the outer wood layer are for example beech and oak.

Further, due to the intermediate metallic layer of the laminated building element, cutting performance of any cutting tool, such as disc grinder, will be heavily impaired.

The intermediate metallic layer is made of an aluminium or aluminium alloy sheet, a soft material, that constitutes a sticky material when machined. Aluminium is also favourable since it has a relatively low weight in comparison to many other metals.

An intermediate metallic layer having a thickness in the range of 1-10 mm, preferably 2-8 mm, and more preferably 3-6 mm, can be used. This material will stick to the cutting edge of the tool which in turn will significantly lower the performance and increase the wear of the tool, such as a disc grinder, drill or reciprocating saw. Further, other methods such as melting the intermediate metallic layer, would take a very long time.

The inner ceramic layer of the laminated building element is hard and prevents or at least strongly counteracts that a drill is used for drilling through the entire laminated building element in order to use a reciprocating saw for forcing the wall when an opening has been achieved. In any case, sawing the laminated building element by means of a reciprocating saw would take a very long time and a lot of equipment and electric power, since the combination of layers of the laminated building element is very difficult to force due to the different characteristics of the materials used in the layers.

The inner ceramic layer can have a thickness in the range of 1-10 mm, preferably 1-8 mm, and more preferably 2-6 mm.

The inner ceramic layer is preferably porcelain. Porcelain is a ceramic material, which is made by heating kaolin and other constituent materials such as clays, feldspar or flint, and silica, in a furnace to high temperatures, for example between 1200° C. and 1400° C. The porcelain can suitably be obtained by wet grinding of clayish raw materials, granite and metamorphic, feldspar-containing rocks. Further, it is compacted by shaping in a compacter and sintering at high temperature.

According to one embodiment of the shipping container, the laminated building element comprises a layer of fiberglass cloth arranged on the inner ceramic layer on a side facing away from the intermediate metallic layer. For example, the fibreglass cloth layer can have a thickness in the range of 0.2-2 mm, preferably 0.3-1.5 mm. Hereby, the strength of the inner ceramic layer will be improved. Even if the inner ceramic layer would be broken by use of a sledgehammer or a chisel, the fibreglass cloth will keep the pieces of the inner ceramic layer together and complicate forcing of the laminated building element.

According to a further embodiment of the shipping container, the laminated building element comprises a further layer of wood arranged on an opposite side of the inner ceramic layer in comparison with the outer wood layer. Hereby, the inner ceramic layer can be supported on the inside by the further layer of wood and thereby the inner ceramic layer will become less sensitive to impacts and shocks from outside the laminated building element, which prevents the inner ceramic layer from being crushed by a tool, such as a chisel, if the outer wood layer and the intermediate metallic layer should have been forced. In addition, the further wood layer makes sawing of the laminated building element with a reciprocating saw, for instance, even further complicated.

The further wood layer can be made in the same way and from the same materials as previously described herein with reference to the outer wood layer. For example, the further wood layer can be plywood with a thickness in the range of 5-30 mm, preferably 8-25 mm, and more preferably 12-20 mm.

By the term shipping container is meant any container for storing and/or transporting goods where the container can be locked to prevent theft of the goods, such as intermodal containers. These containers can be used for storing goods and be transported by rail, truck or container ship. The containers often have standardized dimensions and can usually be stacked on top of each other. For example, storage containers can be used on building sites where a lot of valuable equipment is to be stored, and shipping containers can be used for transports of theft-prone goods.

The container preferably comprises a plurality of said laminated building element constituting inner walls and a ceiling of the container. Such inner walls are suitably used in combination with outer steel walls which are standard for these types of container. Due to the fact that the inner walls can be made with a relatively small thickness, the storing space of the container does not need to be substantially reduced.

According to a further embodiment of the shipping container, the inner walls and the ceiling are connected to each other forming a structure which stands on beams of the container. Such beams are suitably arranged in the floor portion of the container. Hereby, the inner walls and the ceiling do not have to be attached to external wall elements, such as corrugated sheet, of the container. The structure can be self-supporting or the inner walls and/or the ceiling can be attached to beams of the outer steel walls by bolted joint or glue. This is favourable since the laminated building elements can be installed while the external wall elements, which often are relatively thin steel walls used for forming a container casing, can remain unmodified.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1A:
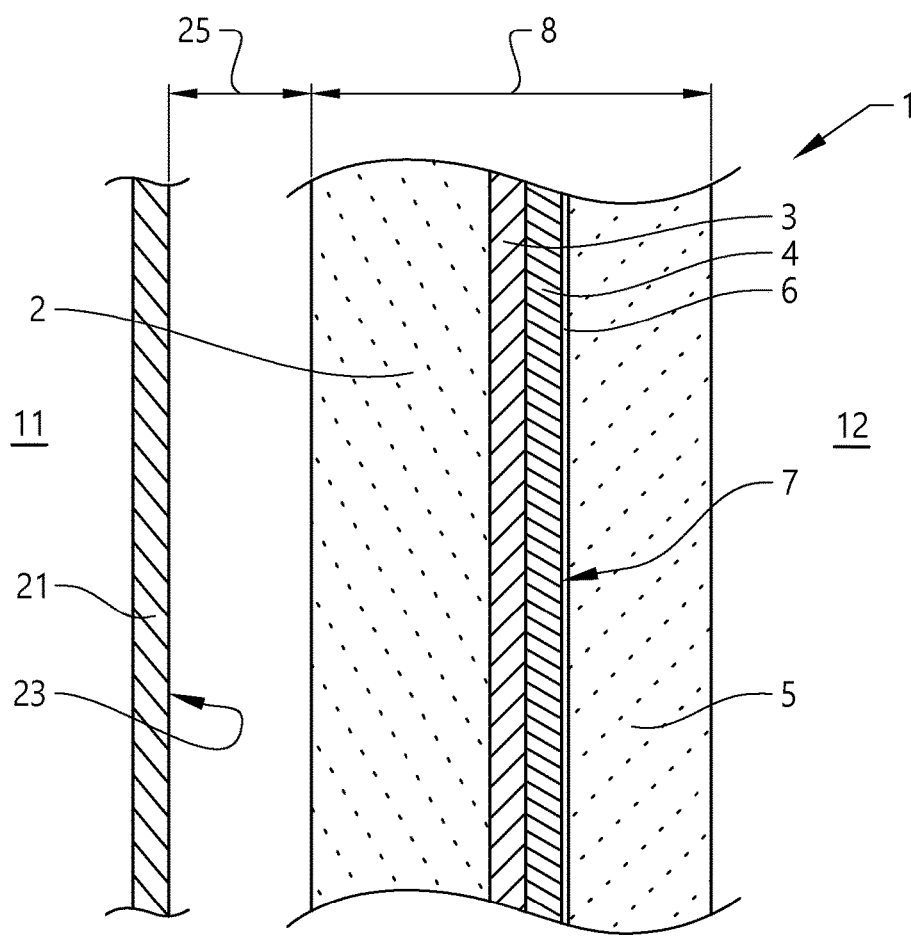
FIG. 1A is a cross section view of a laminated building element.

FIG. 1A is a cross section view of a laminated building element 1. The laminated building element 1 comprises an outer layer 2 of wood, an intermediate metallic layer 3, and an inner layer 4 of ceramic. The laminated building element 1 can also comprise a further layer 5 of wood arranged on an opposite side of the inner ceramic layer 4 in comparison with the outer wood layer 2.

As illustrated in FIG. 1A, the order of the layers of the laminated building element 1 starting from the outside is as follows; the outer wood layer 2, the intermediate metallic layer 3, and then the inner ceramic layer 4, and finally the further wood layer 5 if such a layer is applied. As also shown in the embodiment illustrated in FIG. 1A, optionally, the laminated building element 1 can comprise a layer 6 of fiberglass cloth arranged on the inner ceramic layer 4 on a side 7 facing away from the intermediate metallic layer 3. The fibreglass cloth layer 6 is arranged on the inside surface 7 of the inner ceramic layer 4 between the inner ceramic layer 4 and the further wood layer 5.

In the example embodiment illustrated in FIG. 1A, the outer wood layer is 27 mm Birch Plywood, made from a set of veneer sheets each having a thickness of 1 mm, the intermediate metallic layer is a 5 mm aluminium sheet, the inner ceramic layer is 3 mm Porcelain, and the further wood layer is 15 mm Birch Plywood, made from a set of veneer sheets each having a thickness of 1 mm. The fiberglass cloth layer 6 has a thickness of 0.5 mm. The total thickness 8 of the laminated building element 1 is approximately 54 mm.

The layers of the laminated building element 1 which are arranged adjacent to each other are attached to each other. The layers of the laminated building element 1 are suitably joined by gluing, for example by means of a two-component adhesive.

The laminated building element 1 can be prefabricated by attaching the layers to each other and thereafter be transported and used in an application as a unit for establishment of a wall or a ceiling. Alternatively, the laminated building element 1 is produced step by step, in situ where it is to be used, by attaching the layers to each other one at the time for creating the current structure.

FIG. 1A shows a portion of the laminated building element 1 in a cross section view. The shown dimension is the thickness 8 of the laminated building element 1, which usually is in the range of 20-100 mm, and often 30-70 mm. The remaining dimensions can be in the range of a few decimetres up to a few meters.

Figure 1B:
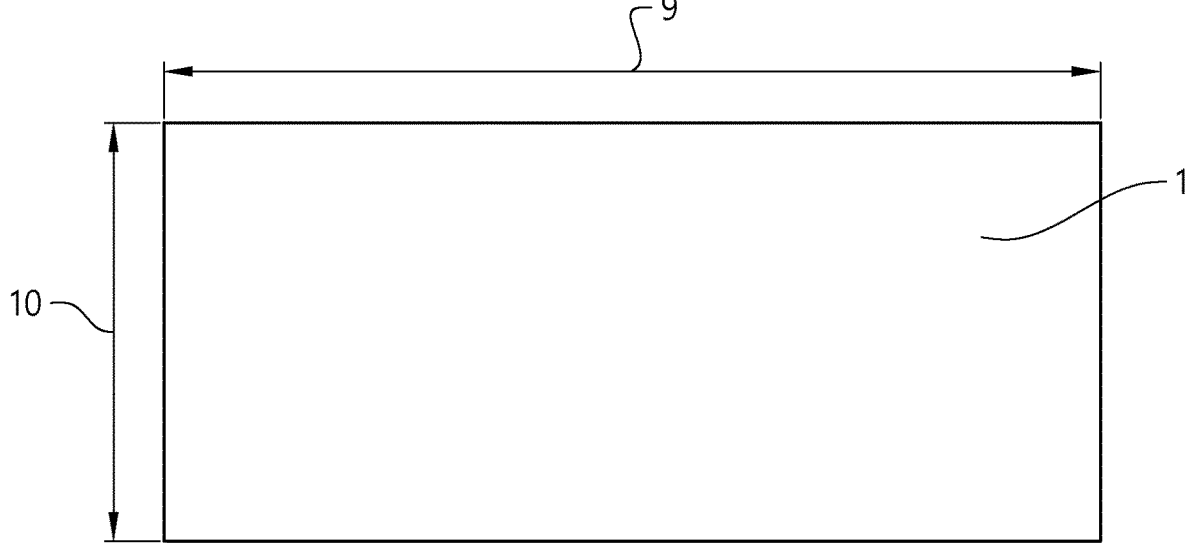
FIG. 1B is a front view of the laminated building element in FIG. 1A.

FIG. 1B shows schematically the width 9 and height 10 of the laminated building element 1. For example, the laminated building element 1 may be rectangular with dimensions; width, height and thickness being in the sizes of approximately 3000*1000*50 mm.

Although rectangular laminated building elements often are used, of course the shape and the dimensions of the laminated building element 1 can be varied and adapted to the current application.

As illustrated in FIG. 1A, the laminated building element 1 is preferably arranged such that the outer wood layer 2 is facing the surrounding 11 outside a space 12 to be protected from burglary, whereas the further wood layer 5 is facing the space 12 to be protected from burglary. In another embodiment where no further wood layer is used, the inner ceramic layer is facing the space to be protected from burglary.

Figure 2:
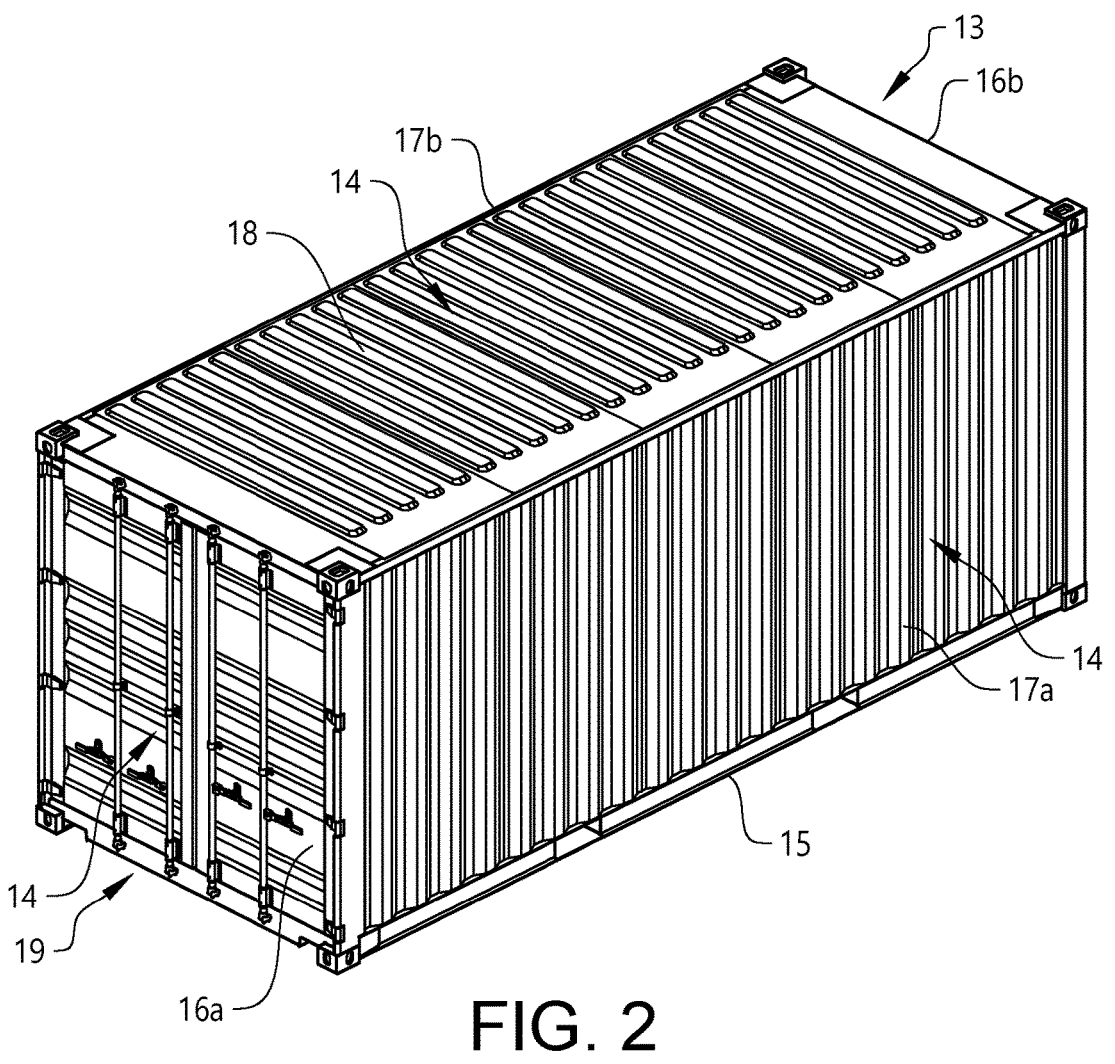
FIG. 2 shows a container in a perspective view.

FIG. 2 shows in a perspective view a container 13 for storing and transporting goods. The container can be an intermodal container, also called standardized ISO-container or shipping container. Such a container has standardized dimensions. These containers can be loaded and unloaded, stacked on top of each other, and be transported by rail, truck or container ship.

The container 13 has walls 14 and a floor 15 for creating a storage space to be loaded by goods. The walls 14 can comprise standard steel walls including side portions 16*a*, 16*b*, front portions 17*a*, 17*b* and a roof portion 18 which together form a casing. The steel walls can be made from corrugated sheet. At a first side portion 16*a*, the container 13 is provided with doors 19 and lock for locking the doors. The doors 19 give access to the storing space and make it possible to load and unload goods. The doors 19 and the lock are standardized for this type of container.

Figure 3:
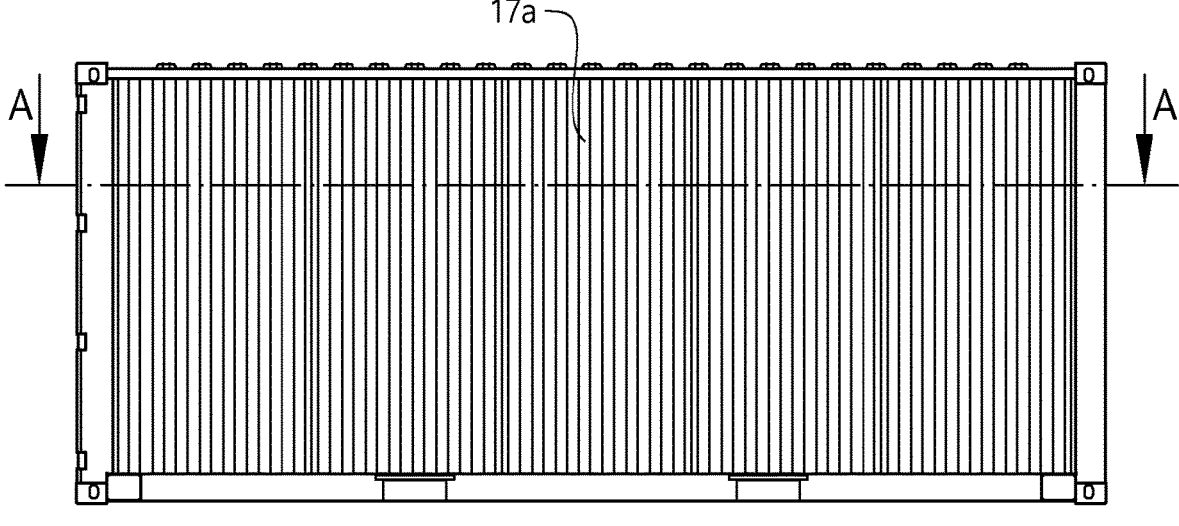
FIG. 3 is a front view of the container in FIG. 2.
Figure 4:
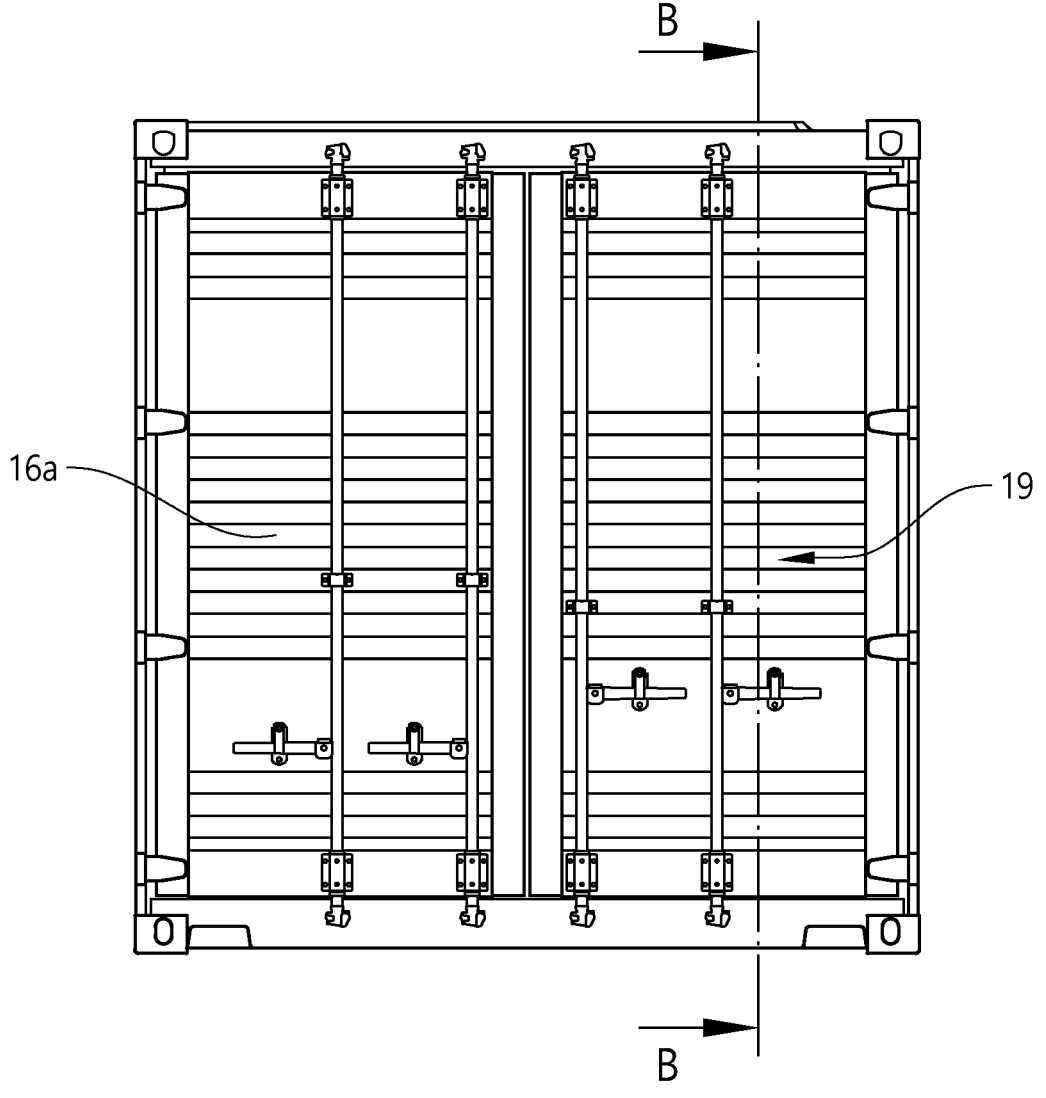
FIG. 4 is a side view of the container in FIG. 2.

FIG. 3 is a front view of the container 13 showing a first front portion 17*a*. FIG. 4 is a side view of the container 13 showing the first side portion 16*a* provided with the doors 19.

Figures 5A, 5B:
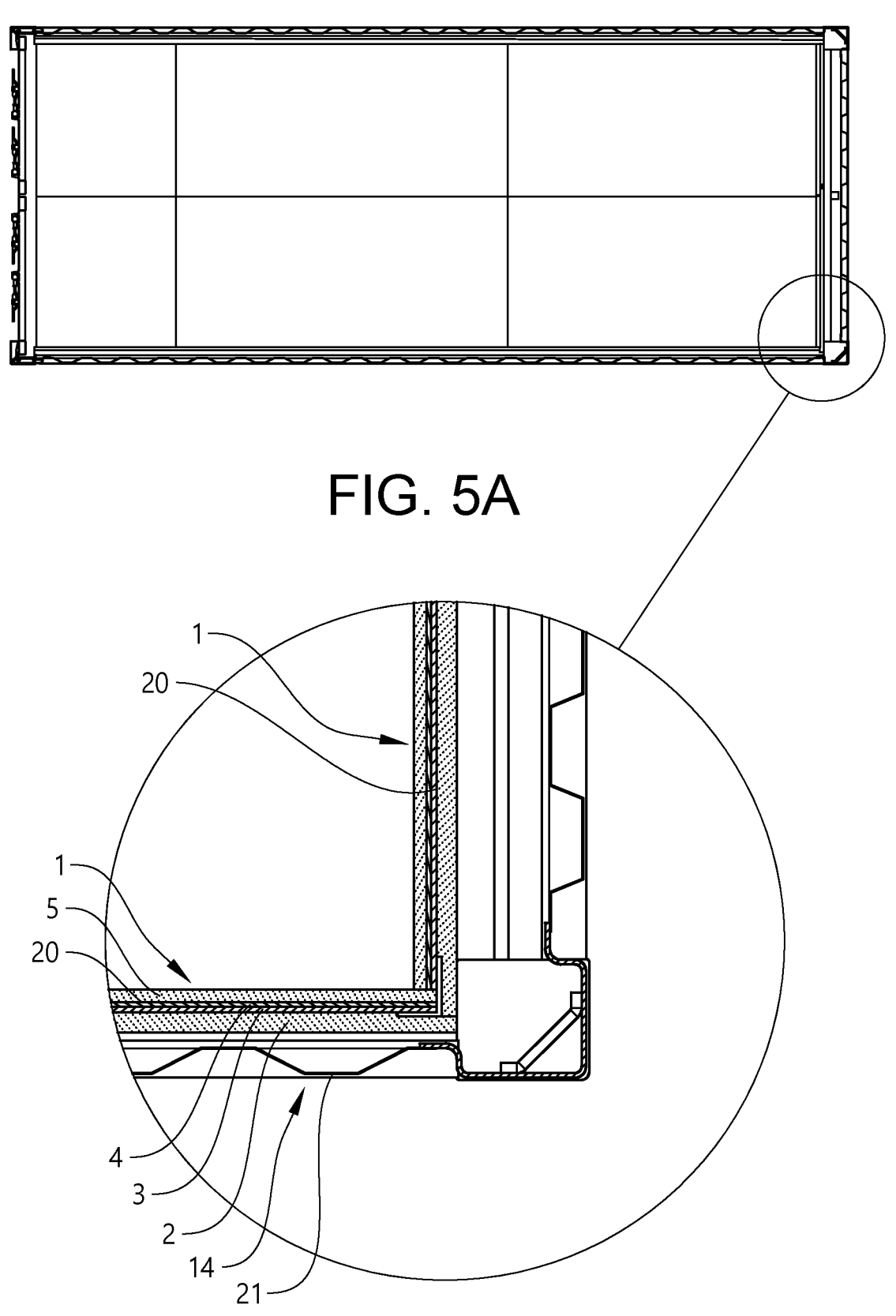
FIG. 5A is a cut view along A-A in FIG. 3.
FIG. 5B is an enlarged view of a portion of the container in FIG. 5A.

FIG. 5A is a cut view along A-A in FIG. 3, and FIG. 5B is an enlarged view of a portion of the container in FIG. 5A. As appears from FIG. 5B, laminated building elements 1 as described hereinabove are arranged as inner walls 20 of the container 13. In other words; the container wall 14 comprises an external wall element 21, such as the standard steel wall, and the laminated building element 1 arranged inside the external wall element 21 as an inner wall 20.

As previously described, the laminated building element 1 comprises the outer layer 2 of wood, the intermediate metallic layer 3, the inner ceramic layer 4 and the further layer 5 of wood. The laminated building element 1 is arranged with the outer wood layer 2 facing the external wall element 21.

Figures 6A, 6B:
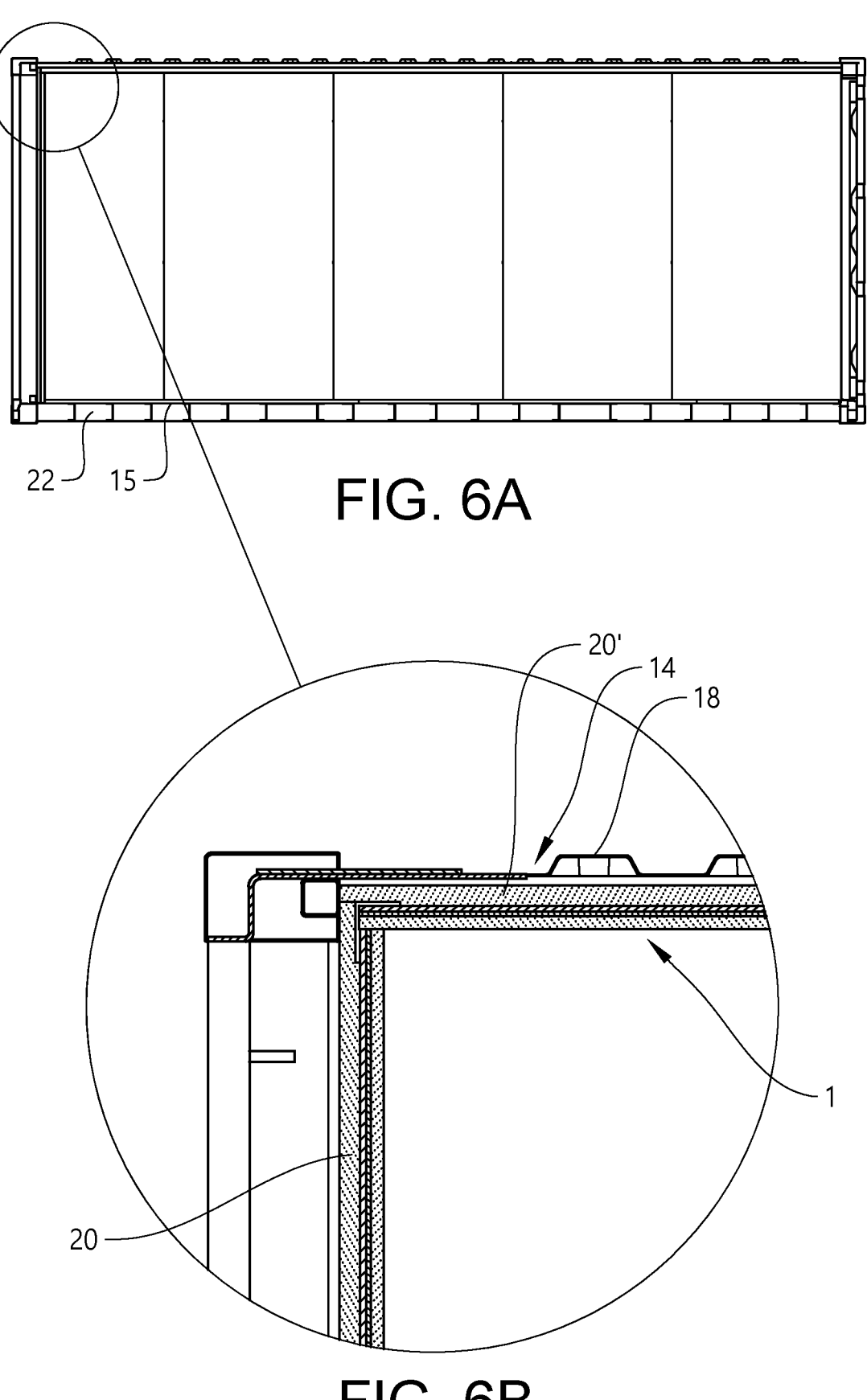
FIG. 6A is a cut view along B-B in FIG. 4.
FIG. 6B is an enlarged view of a portion of the container in FIG. 6A.

FIG. 6A is a cut view along B-B in FIG. 4, and FIG. 6B is an enlarged view of a portion of the container in FIG. 6A. In FIG. 6B, the laminated building element 1 arranged inside the roof portion 18 as a ceiling 20' of the container 13 is illustrated.

The container 13 suitably comprises a plurality of said laminated building element 1 constituting inner walls 20 and a ceiling 20' such that all container walls 14 should be burglar-proof. This means that the inner walls 20 and the ceiling 20' also define the volume of the storage space of the container 13.

The inner walls 20 and the ceiling 20' may be connected to each other forming a structure which stands on beams 22 of the container. Such beams 22 of the container 13 supporting the structure can also be used for supporting the floor 15 of the container 13. See also FIG. 6A. The structure formed by the inner walls and the ceiling can be self-supporting standing on the floor beams 22, or the inner walls and/or the ceiling can be attached to beams of the outer steel walls by bolted joint or glue for further support of the structure.

The inner walls 20 are suitably arranged close to the external wall elements 21 such as outer steel walls. In this way, the reduction of the space available for loading goods in the container is minimized.

On the other hand, as also schematically shown in FIG. 1A, by arranging the laminated building element 1 at a distance from the inside surface 23 of the external wall element 21 such that a small gap 25 between the external wall element 21 and the laminated building element 1 is created, deformation or movement of the external wall element 21 relative to the laminated building element 1 without affecting the laminated building element 1 can take place.

In addition to inner walls and ceiling, the laminated building element 1 can be used for many other components such as for example doors. For the container 13 illustrated in FIG. 2, at the first side portion 16*a* provided with the doors 19, laminated building elements 1 are used for providing inner doors arranged inside the doors 19 of the steel wall, for enabling access to the storing space of the container 13. The inner doors made from the laminated building element 1 are provided with a lock as well, which lock prevents unauthorized access to the inside of the container 13 should the doors 19 of the steel wall be broken.

It is to be understood that the present invention is not limited to the embodiments described above and illustrated in the drawings; rather, the skilled person will recognize that many changes and modifications may be made within the scope of the appended claims.

The invention claimed is:

1. A shipping container (13) having a wall (14) comprising an external wall element (21), characterized in that the wall (14) comprises a laminated building element (1), the laminated building element comprising an outer layer of wood (2), an intermediate metallic layer (3) being an aluminum or aluminum alloy sheet, and an inner layer of ceramic (4), wherein the laminated building element (1) is arranged inside the external wall element with the outer wood layer (2) facing the external wall element (21), and the laminated building element (1) is arranged at a distance from an inside surface (23) of the external wall element such that a gap (25) between the external wall element and the laminated building element is created.

2. A shipping container according to claim 1, characterized in that the container (13) comprises a plurality of said laminated building elements (1) constituting inner walls (20) and a ceiling (20') of the container.

3. A shipping container according to claim 2, characterized in that the inner walls (20) and the ceiling (20') are connected to each other forming a structure which stands on beams (22) of the container.

4. A shipping container according to claim 3, characterized in that the structure is self-supporting.

* * * * *